Feb. 6, 1951 J. JESIONOWSKI 2,540,889
FILING MACHINE
Filed Nov. 8, 1946 2 Sheets-Sheet 1

Inventor
John Jesionowski
By Rockwell & Bartholow
Attorneys

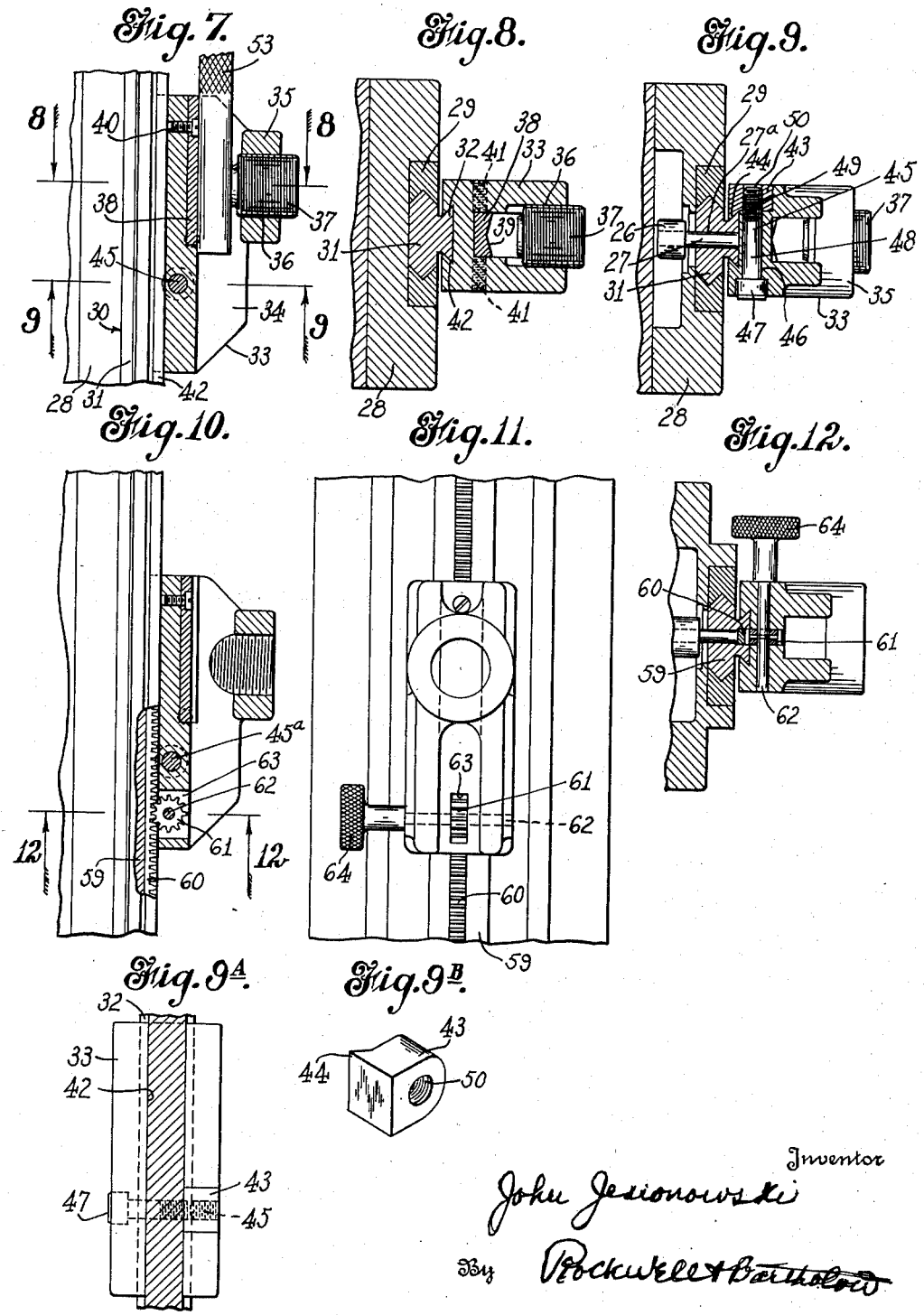

Patented Feb. 6, 1951

2,540,889

UNITED STATES PATENT OFFICE 2,540,889

FILING MACHINE

John Jesionowski, Schenectady, N. Y.

Application November 8, 1946, Serial No. 708,686

1 Claim. (Cl. 29—76)

This invention relates to filing machines, and while not limited thereto it is especially directed to that type of machine disclosed in my Patent No. 2,327,843, dated August 24, 1943.

In that patent there is disclosed a filing machine comprising a reciprocable tool-carrying slide adapted to carry an upwardly projecting file or a downwardly projecting file, said slide being adapted to move up and down on the machine frame, and the machine frame being equipped with work tables respectively located above and below the slide. The upper table has a file aperture through which a file carried by said slide may operate in filing out a workpiece in the form of a die or other hollow or open member, and the lower work table is equipped to support a workpiece in the form of a punch or like member, which can be acted upon by a file extending in a downward direction from the file-carrying slide.

The present invention has for one of its objects the facilitating of the inspection of a workpiece being operated upon, for example, a workpiece carried by the upper table. Heretofore inspection has required the lifting of the workpiece from the table while the working file remained in place. This was a great inconvenience to the workman filing a die on the upper table, especially where numerous inspections were required before the die was completed. The same condition applied in the case where the workpiece was a punch-like member on the lower table, and this workpiece had cavities or blind holes which were engaged by the file, for in this case also it was necessary to shift the workpiece for inspection purposes. After inspection it was necessary to replace the workpiece, and thus considerable time was lost.

Another object of the invention is to increase the speed of operation of the machine and enlarge its scope and increase its output.

In the accompanying drawings:

Fig. 7 is a view similar to Fig. 6, showing an upwardly directed file carried in the holder;

Figure 3:
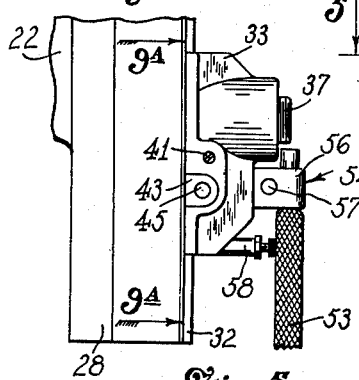
Fig. 3 is an elevation showing on a larger scale a portion of Fig. 1.
Figure 4:
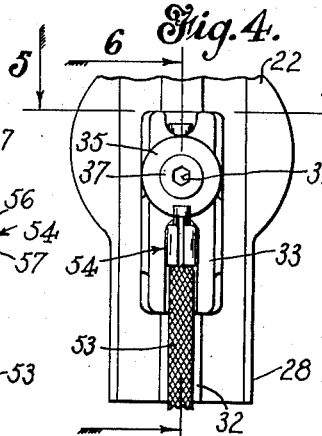
Fig. 4 is an elevation of the parts shown in Fig. 3, Fig. 4 being taken at right angles to Fig. 3.

Figs. 8 and 9 are sections on lines 8—8 and 9—9, respectively, of Fig. 7;

Fig. 9A is a section on line 9A—9A of Fig. 3;

Fig. 9B is a detail perspective view of a clamping plate;

Fig. 10 is a view generally similar to Fig. 7, showing a modified form of file holder in longitudinal section;

Fig. 11 is an elevation of the parts shown in Fig. 10; and

Fig. 12 is a section on line 12—12 of Fig. 10.

In the drawings, there is shown a machine of the general type disclosed in my Patent No. 2,327,843. This machine has a base 20 on which is an upstanding frame 21 and an upper horizontally disposed extension 22 carrying an upper work table 23. The lower work table 24 is mounted upon the base 20. An electric motor 25 is mounted upon the base and is arranged to actuate mechanism carried by the extension 22 and including a crank 26 having a crank pin 27. These parts may be constructed in the manner described in my patent.

Figure 6:
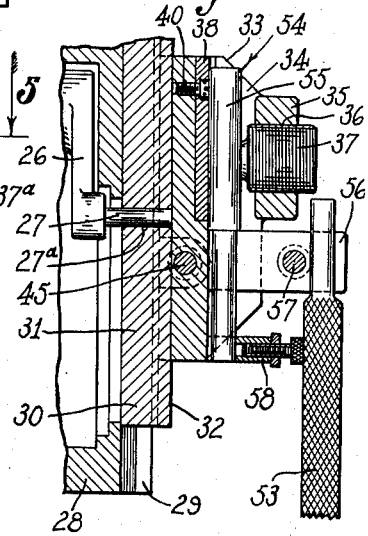
Fig. 6 is a section on line 6—6 of Fig. 4, on a larger scale.
Figure 5:
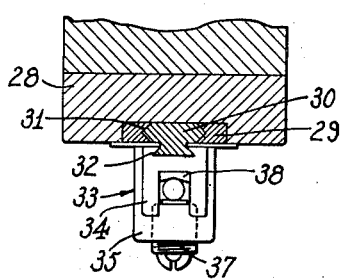
Fig. 5 is a section on line 5—5 of Fig. 4.

Mounted upon the free end portion of the extension 22 is a part 28 directed vertically for the purpose of providing a slideway, and this part is provided adjacent its outer or forward face with an insert 29 in which is guided a slide member 30. The slide member 30 preferably has a body 31 of prismatic cross section, as best shown in Fig. 8, that provides angular edge portions which conform to and are received in correspondingly shaped grooves in the insert 29, whereby the slide 30 is guided accurately for rectilinear movement without looseness or play. This member 30 is adapted to be reciprocated in its guideway by means of the crank pin 27, which crank pin extends into an opening 27a in member 30, as shown in Figs. 6 and 9. The body portion 31 of member 30 is located within the lines of part 28, but at the forward face of part 28 slide 30 is provided with a projecting dovetail portion 32. This portion 32 serves as a means for connecting to slide 30 a file holder 33 adapted to be reciprocated by the slide member and adapted to carry either an upwardly directed file or a downwardly directed file, as hereinafter described.

The holder 33 in the present embodiment is in the form of a rectangular block which is of channel shape in horizontal cross section, the channel facing away from the machine and being open at its opposite ends so that files can be readily introduced into the same, the holder also being equipped with means for clamping the file in place. In the drawings the channel provided in the holder is indicated at 34, and associated with the channel is an integral bridge member 35 having an interiorly threaded socket 36 receiving a clamping screw 37 adapted to clamp in place an upwardly directed file or a downwardly directed file, as hereinafter described. The clamping effect is produced between the inner end of the screw 37 and the bottom of the channel 34, and the bottom of the channel may be equipped with a hardened plate 38 having a sloped centering face 39 to receive the file or other cylindrical member. The hardened plate 38 is held in place in the body of the holder 33 by means such as a screw 40 located adjacent the upper end of the holder, and adjacent the lower end of plate 38 the latter may be held accurately in position by means such as small screws 41 arranged at the sides of the channel 34 in the manner shown in Fig. 8.

The holder 33 is provided at its rear face with a dovetail groove 42 extending vertically thereof and receiving the dovetail portion 32 of the slide 30. The holder is adapted to be adjusted lengthwise of the slide and then clamped firmly in position thereon, and for this purpose the portion of the holder at one side of the groove 42 is cut away to provide a gap in which is received a small clamping piece 43 having a pointed edge 44 overhanging the projection 32 and conforming thereto, and adapted to be clamped against said projection. The clamping piece 43 is adapted to be clamped by a screw 45 passing through an opening 46 extending laterally through the holder, said screw 45 having a manipulating head 47, and a shank 48 provided at its end with screw threads 49 which engage threads in a socket 50 provided in clamping piece 43.

It will be evident that by this construction the holder, when screw 45 is sufficiently released, can be slid along the slide to place it in the desired longitudinal position thereon, and then may be fixed in place by tightening up on the screw.

The structure described provides a very effective and convenient means adapting the machine to operation on an open piece such as a die member 51 supported on table 23, or on a piece such as a punch-like member 52 supported upon the lower table 24. In the former case a file 53 may be mounted in the holder in the manner indicated in Figs. 2 and 7. The holder may have a position at a substantial distance above the lower end of extension 28, and the lower end of the file can be introduced into the upper end of the channeled holder and clamped in position against plate 38 by means of screw 37. Then the reciprocating holder carrying the file will have the required action upon the workpiece. When it is necessary to operate on a workpiece supported on the lower table, the file is removed from the position just referred to, and may then be supported from the holder so as to project downwardly into working relation to the workpiece. In this case a fixture, generally indicated at 54, may be conveniently used for holding the file in the holder, said fixture including a rod 55 introduced into the upper channeled portion of the holder from below and clamped in place by screw 37, in the manner shown in Fig. 6. The rod 55 is equipped with a clamp bracket 56 projecting rigidly and laterally from the lower part thereof and having a clamping screw 57 by means of which the file can be clamped. For supporting the file against canting, a brace 58 in the nature of an adjustable spacer may be introduced between the lower end of the rod 55 and the opposing portion of the file, as illustrated in Fig. 6. The structure described provides for the firm and precise clamping of the upper part of the fixture in the holder, and it also provides a holder which accommodates the lower part of the fixture and the file carried thereby in a convenient manner, while at the same time the fixture supports the file firmly in the required position.

Figure 1:
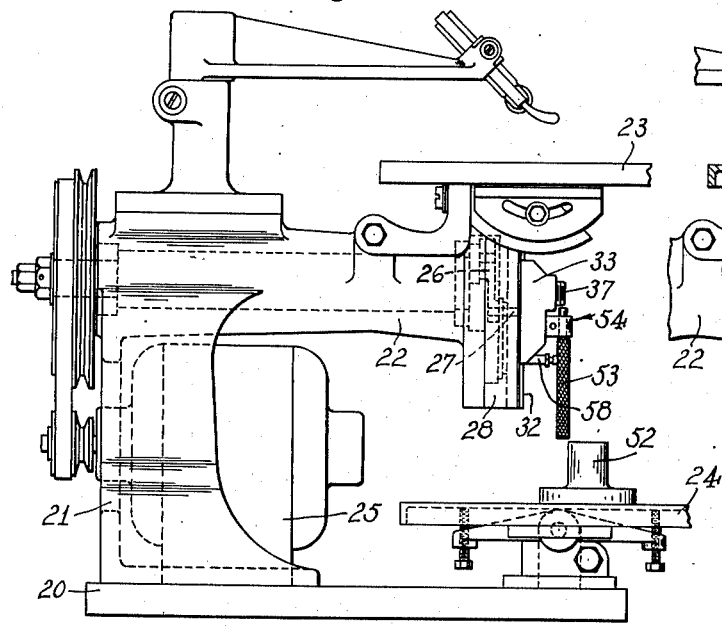
Fig. 1 is a side elevation of a filing machine embodying my improvements, showing the machine equipped with a file arranged to operate upon a workpiece supported upon the lower table.
Figure 2:
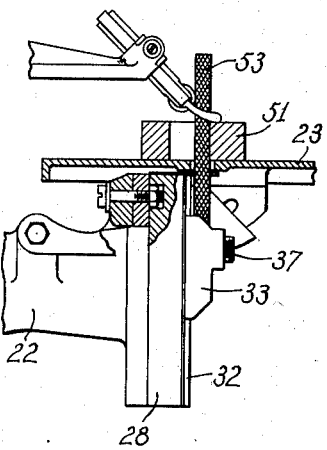
Fig. 2 shows a portion of the machine of Fig. 1, and illustrates the arrangement for operating on a workpiece supported by the upper table, this view being partly in elevation and partly in section.

It will be noted, by comparison of Fig. 2 with Fig. 1, that for the use illustrated in Fig. 1 the holder is moved to a somewhat lower position relatively to its carrying slide.

The screw 37 may be operated by a small wrench inserted into a hexagonal socket 37ª with which the screw is provided.

In the modified form shown in Figs. 10, 11 and 12, the construction is similar to that illustrated in the other views, but there is provision for shifting the holder relatively to its slide by mechanical means so that the shift of the holder can be nicely controlled. For this purpose the slide 59 is equipped with a rack 60 engaged by a small pinion 61 mounted on a rotary shaft 62 and disposed in a recessed portion 63 at the lower part of the holder below the clamping screw 45ª, which corresponds to the clamping screw 45 previously described. The shaft 62 carries at one end a knurled operating head 64 by means of which the pinion 61 can be rotated, and it will be understood that by rotation of the pinion the holder can be moved in the desired direction on the slide. This operation takes place while the screw 45ª is in a released position, and after the holder has reached the desired longitudinal position the screw 45ª is tightened for clamping the holder firmly in position as in the form previously described.

By the present invention the filing machine is improved to a considerable extent, particularly as regards its rapidity and convenience of operation in adjusting the machine for the required filing operations. The structure of the machine is simplified and the scope of the machine is increased. Only one holder for the files is required, this holder being adapted to hold an upwardly directed file or one which is directed downwardly, and the holder is adjustable quickly and conveniently with respect to its carrying reciprocating member so that, without regard to the particular position which the file has in the holder, the file can have the required movement relatively to the workpiece. In making inspections of the workpieces it is not necessary to remove or shift the workpiece from its position in the machine, for the reason that it is possible for the holder to be shifted readily for the purpose of moving the file out of the way to a position allowing full access to the workpiece. The labor necessary for lifting the workpieces is, therefore, eliminated. After every inspection of the workpiece the file in its file holder can be readily slid back to its operative position without disturbing the workpiece. Also when the time comes to replace the workpiece this can be accomplished much more conveniently because of the fact that the file can be slid out of the way and then restored to operative position when a new workpiece has been placed upon the work table.

While two embodiments of the invention are shown herein, it is understood that these are by way of example only, and that many modifications and changes in the details may be made without departing from the principles of the invention or the scope of the claim.

What I claim is:

In a machine such as described, a stationary frame having a vertically disposed rectangular recess in one side thereof, an insert in said recess providing a vertical slideway having angular edge portions, a slide member mounted for reciprocating movement in the slideway and having a body of prismatic cross section conforming to the angular edge portions of the slideway and having a forwardly projecting dovetailed portion, a tool holder having a body portion of channeled cross section and having a dovetailed slot mounted on said forwardly projecting dovetailed portion of the slide and adaptable for rectilinear adjustment on said dovetailed portion, an insert at the bottom of said channeled portion provided with inclined outer surfaces for seating a tool, said tool holder having a part bridging a portion of said channeled portion and provided with a threaded opening, and a bolt passing through said opening for clamping either an upwardly extending tool or a depending tool against said seat.

JOHN JESIONOWSKI.

REFERENCES CITED

The following references are of record in the file of this patent:

UNITED STATES PATENTS

| Number | Name | Date |
| --- | --- | --- |
| 1,412,915 | Boker | Apr. 18, 1922 |
| 2,114,994 | Brickner | Apr. 26, 1938 |
| 2,132,540 | Pope et al. | Oct. 11, 1938 |
| 2,327,843 | Jesionowski | Aug. 24, 1943 |
| 2,421,459 | Marsilius | June 3, 1947 |